(12) United States Patent
Johnsen (10) Patent No.: US 8,842,518 B2
(45) Date of Patent: Sep. 23, 2014

(54) SYSTEM AND METHOD FOR SUPPORTING MANAGEMENT NETWORK INTERFACE CARD PORT FAILOVER IN A MIDDLEWARE MACHINE ENVIRONMENT

(75) Inventor: Bjorn-Dag Johnsen, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 275 days.

(21) Appl. No.: 13/235,177

(22) Filed: Sep. 16, 2011

(65) Prior Publication Data

US 2012/0069730 A1   Mar. 22, 2012

Related U.S. Application Data

(60) Provisional application No. 61/384,228, filed on Sep. 17, 2010, provisional application No. 61/484,390, filed on May 10, 2011, provisional application No. 61/493,330, filed on Jun. 3, 2011, provisional application No. 61/493,347, filed on Jun. 3, 2011, provisional application No. 61/498,329, filed on Jun. 17, 2011.

(51) Int. Cl.
*H04L 12/26* (2006.01)
*H04L 12/24* (2006.01)
*H04L 12/701* (2013.01)
*H04L 12/46* (2006.01)
*H04L 29/14* (2006.01)

(52) U.S. Cl.
CPC ............ *H04L 45/00* (2013.01); *H04L 41/0659* (2013.01); *H04L 69/40* (2013.01); *H04L 12/462* (2013.01)
USPC .................... 370/218; 370/395.3; 370/395.53; 709/249

(58) Field of Classification Search
None
See application file for complete search history.

(56) References Cited

U.S. PATENT DOCUMENTS

| | | |
|---|---|---|
| 5,805,805 A | 9/1998 | Civanlar et al. |
| 6,647,419 B1 | 11/2003 | Mogul |
| 6,748,429 B1 | 6/2004 | Talluri et al. |
| 6,941,350 B1 | 9/2005 | Frazier et al. |
| 6,963,932 B2 * | 11/2005 | Bhat .............................. 709/249 |
| 6,978,300 B1 | 12/2005 | Beukema et al. |

(Continued)

FOREIGN PATENT DOCUMENTS

| | | |
|---|---|---|
| EP | 2 051 436 A1 | 4/2009 |
| WO | 01/90838 A2 | 11/2001 |

OTHER PUBLICATIONS

InfiniBand[SM]Trade Association, InfiniBand™ Architecture Specification, vol. 1, Release 1.2.1, Nov. 2007, pp. 1-1727.

(Continued)

*Primary Examiner* — Michael J Moore, Jr.
(74) *Attorney, Agent, or Firm* — Meyer IP Law Group (57) ABSTRACT

A system and method can support virtual network interface card (NIC) failover in a middleware machine environment. The middleware machine environment includes a local management node and a remote management node. The system provides a local NIC driver and a remote proxy instance on a local management node. The remote proxy instance can associate a machine address with a remote NIC driver on a remote management node that is connected with the local remote management node in a subnet. Furthermore, the remote proxy instance operates to direct packets to and from the remote NIC driver using the machine address.

20 Claims, 7 Drawing Sheets

(56) References Cited

U.S. PATENT DOCUMENTS

| | | |
|---|---|---|
| 6,985,956 B2 | 1/2006 | Luke et al. |
| 7,069,468 B1 | 6/2006 | Olson et al. |
| 7,113,995 B1 | 9/2006 | Beukema et al. |
| 7,185,025 B2 | 2/2007 | Rosenstock et al. |
| 7,200,704 B2 | 4/2007 | Njoku et al. |
| 7,216,163 B2 | 5/2007 | Sinn |
| 7,231,518 B1 | 6/2007 | Bakke |
| 7,290,277 B1 | 10/2007 | Chou et al. |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 * | 12/2009 | Droux et al. .................. 710/306 |
| 7,636,772 B1 | 12/2009 | Kirby et al. |
| 7,685,385 B1 | 3/2010 | Choudhary et al. |
| 7,724,748 B2 * | 5/2010 | Davis ......................... 370/395.3 |
| 7,783,788 B1 | 8/2010 | Quinn et al. |
| 7,843,822 B1 | 11/2010 | Paul et al. |
| 7,860,961 B1 | 12/2010 | Finkelstein et al. |
| 7,873,711 B2 * | 1/2011 | Adams et al. .................. 709/222 |
| 8,291,148 B1 * | 10/2012 | Shah et al. .................... 710/316 |
| 8,327,437 B2 | 12/2012 | McAlister |
| 8,331,381 B2 * | 12/2012 | Brown et al. .................. 370/401 |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 2002/0059597 A1 | 5/2002 | Kikinis et al. |
| 2002/0120720 A1 | 8/2002 | Moir |
| 2003/0009487 A1 | 1/2003 | Prabakaran et al. |
| 2003/0093509 A1 | 5/2003 | Li et al. |
| 2003/0105903 A1 | 6/2003 | Garnett et al. |
| 2003/0120852 A1 | 6/2003 | McConnell et al. |
| 2003/0208572 A1 | 11/2003 | Shah et al. |
| 2004/0153849 A1 | 8/2004 | Tucker et al. |
| 2004/0199764 A1 | 10/2004 | Koechling et al. |
| 2004/0249928 A1 | 12/2004 | Jacobs et al. |
| 2005/0044363 A1 | 2/2005 | Zimmer et al. |
| 2005/0071382 A1 | 3/2005 | Rosenstock et al. |
| 2005/0071709 A1 | 3/2005 | Rosenstock et al. |
| 2005/0091396 A1 | 4/2005 | Nilakantan et al. |
| 2005/0105554 A1 | 5/2005 | Kagan et al. |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi et al. |
| 2005/0273641 A1 | 12/2005 | Sandven et al. |
| 2006/0079278 A1 | 4/2006 | Ferguson et al. |
| 2006/0195560 A1 | 8/2006 | Newport |
| 2007/0206735 A1 | 9/2007 | Silver et al. |
| 2008/0031266 A1 | 2/2008 | Tallet et al. |
| 2008/0144614 A1 | 6/2008 | Fisher et al. |
| 2008/0183853 A1 | 7/2008 | Manion et al. |
| 2008/0229096 A1 | 9/2008 | Alroy et al. |
| 2008/0250125 A1 | 10/2008 | Brey et al. |
| 2009/0049164 A1 | 2/2009 | Mizuno |
| 2009/0327462 A1 * | 12/2009 | Adams et al. .................. 709/222 |
| 2010/0080117 A1 | 4/2010 | Coronado et al. |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0306772 A1 | 12/2010 | Arnold et al. |
| 2011/0072206 A1 | 3/2011 | Ross et al. |
| 2011/0110366 A1 | 5/2011 | Moore et al. |
| 2011/0209202 A1 | 8/2011 | Otranen |
| 2011/0222492 A1 | 9/2011 | Borsella et al. |
| 2012/0039331 A1 | 2/2012 | Astigarraga et al. |
| 2012/0195417 A1 | 8/2012 | Hua et al. |
| 2012/0290698 A1 | 11/2012 | Alroy et al. |
| 2013/0138836 A1 * | 5/2013 | Cohen et al. .................. 709/250 |
| 2013/0159865 A1 | 6/2013 | Smith et al. |

OTHER PUBLICATIONS

International Search Report and Written Opinion dated Dec. 15, 2011, International Application No. PCT/US2011/052033, 11 pgs.
International Search Report and Written Opinion dated Dec. 15, 2011, International Application No. PCT/US2011/052021, 9 pgs.
International Search Report and Written Opinion dated Jan. 11, 2012, International Application No. PCT/US2011/052029, 9 pgs.
International Search Report and Written Opinion dated Sep. 12, 2012, International Application No. PCT/US2012/040775, 13 pgs.
Lee, M., Security Enhancement in Infiniband Architecture, Apr. 2005, IEEE, vol. 19, pp. 1-18.
Aurelio Bermudez, On the InfiniBand Subnet Discovery Process, IEEE the Computer Society 2003, pp. 1-6.
Tom Shanley, Infiniband Network Architecture, Pearson Education 2002, p. 559, 561.
Tom Shanley, Infiniband Network Architecture (excerpt), chapter—Detailed Description of the Link Layer, Pearson Education, published 2002, p. 390-392, 485, 491-493, 537-539.

* cited by examiner

SYSTEM AND METHOD FOR SUPPORTING MANAGEMENT NETWORK INTERFACE CARD PORT FAILOVER IN A MIDDLEWARE MACHINE ENVIRONMENT

CLAIM OF PRIORITY

This application claims the benefit of priority on U.S. Provisional Patent Application No. 61/384,228, entitled "SYSTEM FOR USE WITH A MIDDLEWARE MACHINE PLATFORM" filed Sep. 17, 2010; U.S. Provisional Patent Application No. 61/484,390, entitled "SYSTEM FOR USE WITH A MIDDLEWARE MACHINE PLATFORM" filed May 10, 2011; U.S. Provisional Patent Application No. 61/493,330, entitled "STATEFUL SUBNET MANAGER FAILOVER IN A MIDDLEWARE MACHINE ENVIRONMENT" filed Jun. 3, 2011; U.S. Provisional Patent Application No. 61/493,347, entitled "PERFORMING PARTIAL SUBNET INITIALIZATION IN A MIDDLEWARE MACHINE ENVIRONMENT" filed Jun. 3, 2011; U.S. Provisional Patent Application No. 61/498,329, entitled "SYSTEM AND METHOD FOR SUPPORTING A MIDDLEWARE MACHINE ENVIRONMENT" filed Jun. 17, 2011, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

Infiniband (IB) Architecture is a communications and management infrastructure that supports both I/O and interprocessor communications for one or more computer systems. An IB Architecture system can scale from a small server with a few processors and a few I/O devices to a massively parallel installation with hundreds of processors and thousands of I/O devices.

The IB Architecture defines a switched communications fabric allowing many devices to concurrently communicate with high bandwidth and low latency in a protected, remotely managed environment. An end node can communicate with over multiple IB Architecture ports and can utilize multiple paths through the IB Architecture fabric. A multiplicity of IB Architecture ports and paths through the network are provided for both fault tolerance and increased data transfer bandwidth.

These are the generally areas that embodiments of the invention are intended to address.

SUMMARY

Described herein is a system and method that can support virtual network interface card (NIC) failover in a middleware machine environment. The middleware machine environment includes a local management node and a remote management node. The system provides a local NIC driver and a remote proxy instance on a local management node. The remote proxy instance can associate a machine address with a remote NIC driver on a remote management node that is connected with the local remote management node in a subnet. Furthermore, the remote proxy instance operates to direct packets to and from the remote NIC driver using the machine address.

DETAILED DESCRIPTION

Described herein is a system and method for providing a middleware machine or similar platform. In accordance with an embodiment of the invention, the system comprises a combination of high performance hardware (e.g. 64-bit processor technology, high performance large memory, and redundant InfiniBand and Ethernet networking) together with an application server or middleware environment, such as WebLogic Suite, to provide a complete Java EE application server complex which includes a massively parallel in-memory grid, that can be provisioned quickly, and that can scale on demand. In accordance with an embodiment of the invention, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment of the invention, the system can include a plurality of compute nodes, one or more IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Figure 1:
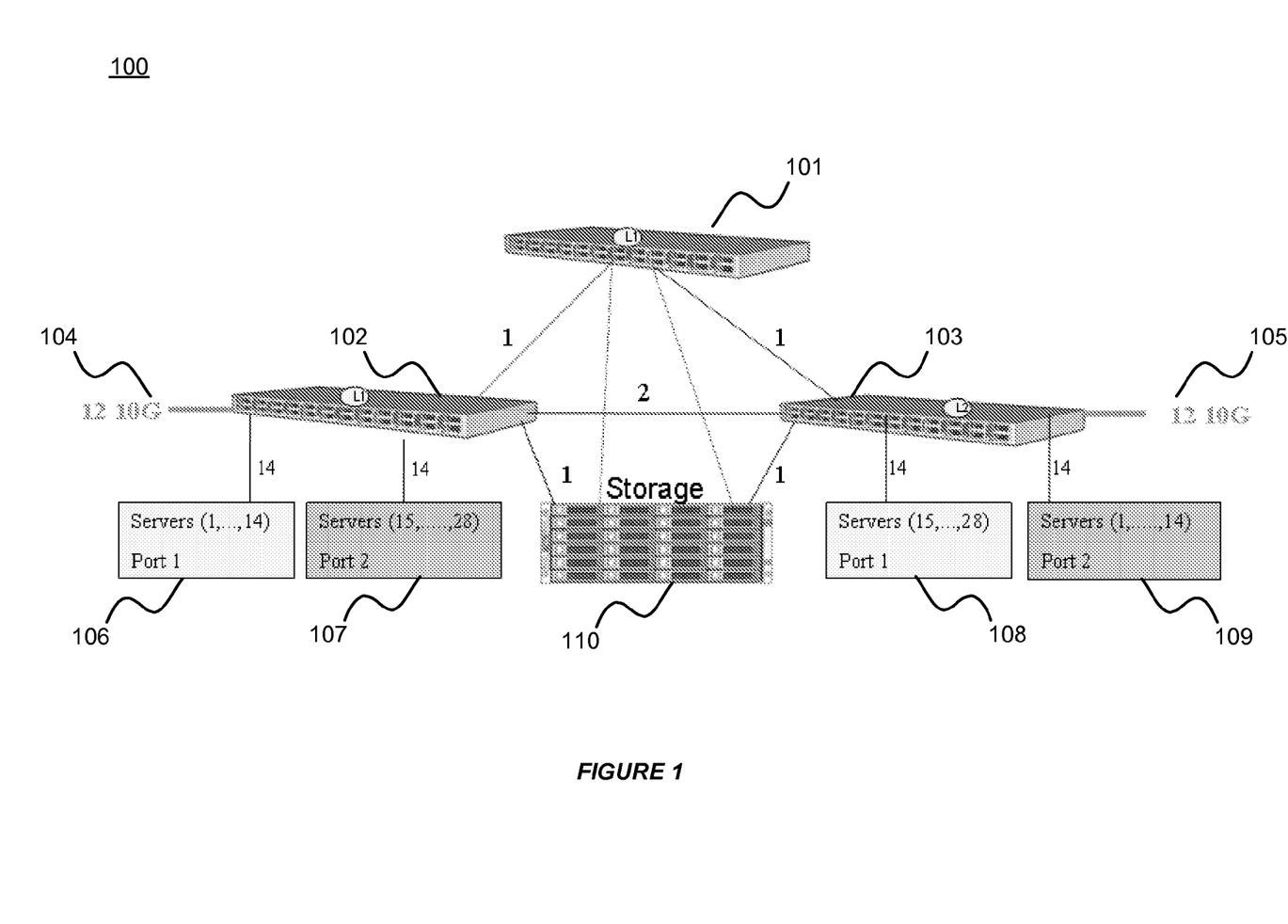
FIG. 1 shows an illustration of an exemplary configuration for a middleware machine, in accordance with an embodiment of the invention.

FIG. 1 shows an illustration of an exemplary configuration for a middleware machine, in accordance with an embodiment of the invention. As shown in FIG. 1, the middleware machine 100 uses a single rack configuration that includes two gateway network switches, or leaf network switches, 102 and 103 that connect to twenty-eight server nodes. Additionally, there can be different configurations for the middleware machine. For example, there can be a half rack configuration that contains a portion of the server nodes, and there can also be a multi-rack configuration that contains a large number of servers.

As shown in FIG. 1, the server nodes can connect to the ports provided by the gateway network switches. As shown in FIG. 1, each server machine can have connections to the two gateway network switches 102 and 103 separately. For example, the gateway network switch 102 connects to the port 1 of the servers 1-14 106 and the port 2 of the servers 15-28 107, and the gateway network switch 103 connects to the port 2 of the servers 1-14 108 and the port 1 of the servers 15-28 109.

In accordance with an embodiment of the invention, each gateway network switch can have multiple internal ports that are used to connect with different servers, and the gateway network switch can also have external ports that are used to connect with an external network, such as an existing data center service network.

In accordance with an embodiment of the invention, the middleware machine can include a separate storage system 110 that connects to the servers through the gateway network switches. Additionally, the middleware machine can include a spine network switch 101 that connects to the two gateway network switches 102 and 103. As shown in FIG. 1, there can be optionally two links from the storage system to the spine network switch.

IB Fabric/Subnet

In accordance with an embodiment of the invention, an IB Fabric/Subnet in a middleware machine environment can contain a large number of physical hosts or servers, switch instances and gateway instances that are interconnected in a fat-tree topology.

Figure 2:
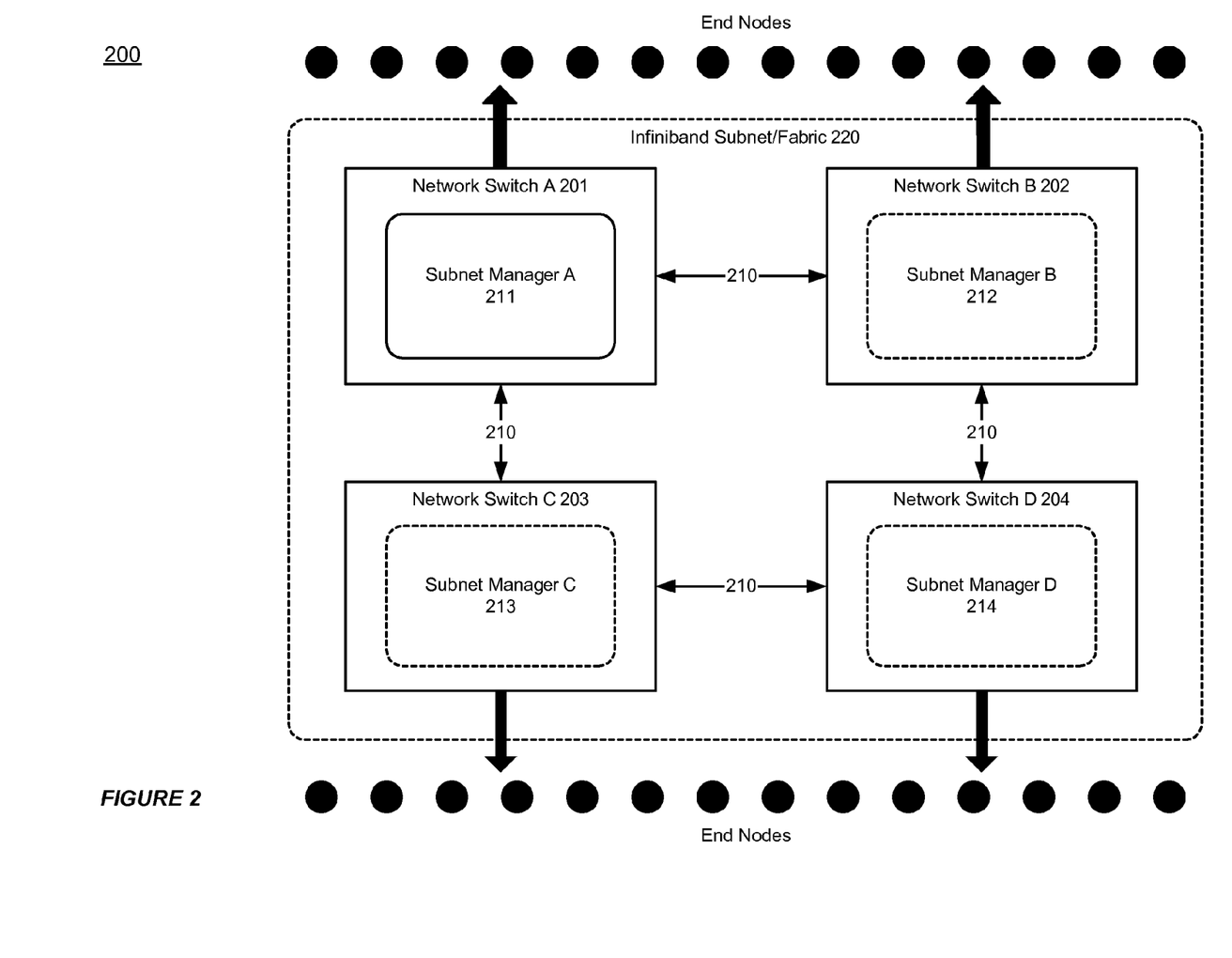
FIG. 2 shows an illustration of a middleware machine environment, in accordance with an embodiment of the invention.

FIG. 2 shows an illustration of a middleware machine environment, in accordance with an embodiment of the invention. As shown in FIG. 2, the middleware machine environment 200 includes an IB subnet or fabric 220 that connects with a plurality of end nodes. The IB subnet includes a plurality of subnet managers 211-214, each of which resides on one of a plurality of network switches 201-204. The subnet managers can communicate with each other using an in-band communication protocol 210, such as the Management Datagram (MAD)/Subnet Management Packet (SMP) based protocols or other protocol such as the Internet Protocol over IB (IpoIB).

In accordance with an embodiment of the invention, a single IP subnet can be constructed on the IB fabric allowing the switches to communicate securely among each other in the same IB fabric (i.e. full connectivity among all switches). The fabric based IP subnet can provide connectivity between any pair of switches when at least one route with operational links exists between the two switches. Recovery from link failures can be achieved if an alternative route exists by re-routing.

The management Ethernet interfaces of the switches can be connected to a single network providing IP level connectivity between all the switches. Each switch can be identified by two main IP addresses: one for the external management Ethernet and one for the fabric based IP subnet. Each switch can monitor connectivity to all other switches using both IP addresses, and can use either operational address for communication. Additionally, each switch can have a point-to-point IP link to each directly connected switch on the fabric. Hence, there can be at least one additional IP address.

IP routing setups allow a network switch to route traffic to another switch via an intermediate switch using a combination of the fabric IP subnet, the external management Ethernet network, and one or more fabric level point-to-point IP links between pairs of switches. IP routing allows external management access to a network switch to be routed via an external Ethernet port on the network switch, as well as through a dedicated routing service on the fabric.

The IB fabric includes multiple network switches with managment Ethernet access to a managment network. There is in-band physical connectivity between the switches in the fabric. In one example, there is at least one in-band route of one or more hops between each pair of switches, when the IB fabric is not degraded. Management nodes for the IB fabric include network switches and management hosts that are connected to the IB fabric.

A subnet manager can be accessed via any of its private IP addresses. The subnet manager can also be accessible via a floating IP address that is configured for the master subnet manager when the subnet manager takes on the role as a master subnet manager, and the subnet manager is un-configured when it is explicitly released from the role. A master IP address can be defined for both the external management network as well as for the fabric based management IP network. No special master IP address needs to be defined for point-to-point IP links.

In accordance with an embodiment of the invention, each physical host can be virtualized using virtual machine based guests. There can be multiple guests existing concurrently per physical host, for example one guest per CPU core. Additionally, each physical host can have at least one dual-ported Host Channel Adapter (HCA), which can be virtualized and shared among guests, so that the fabric view of a virtualized HCA is a single dual-ported HCA just like a non-virtualized/shared HCA.

The IB fabric can be divided into a dynamic set of resource domains implemented by IB partitions. Each physical host and each gateway instance in an IB fabric can be a member of multiple partitions. Also, multiple guests on the same or different physical hosts can be members of the same or different partitions. The number of the IB partitions for an IB fabric may be limited by the P_Key table size.

In accordance with an embodiment of the invention, a guest may open a set of virtual network interface cards (vNICs) on two or more gateway instances that are accessed directly from a vNIC driver in the guest. The guest can migrate between physical hosts while either retaining or having updated vNIC associates.

In accordance with an embodiment of the invention, switches can start up in any order and can dynamically select a master subnet manager according to different negotiation protocols, for example an IB specified negotiation protocol. If no partitioning policy is specified, a default partitioning enabled policy can be used. Additionally, the management node partition and the fabric based management IP subnet can be established independently of any additional policy information and independently of whether the complete fabric policy is known by the master subnet manager. In order to allow fabric level configuration policy information to be synchronized using the fabric based IP subnet, the subnet manager can start up initially using the default partition policy. When fabric level synchronization has been achieved, the partition configuration, which is current for the fabric, can be installed by the master subnet manager.

Management NIC Port Failover between Multiple Independent Switches or Hosts

In accordance with an embodiment of the invention, proxy Ethernet NIC drivers can be used to implement management NIC port failover between the multiple independent switches or hosts on the same IB fabric.

Figure 3:
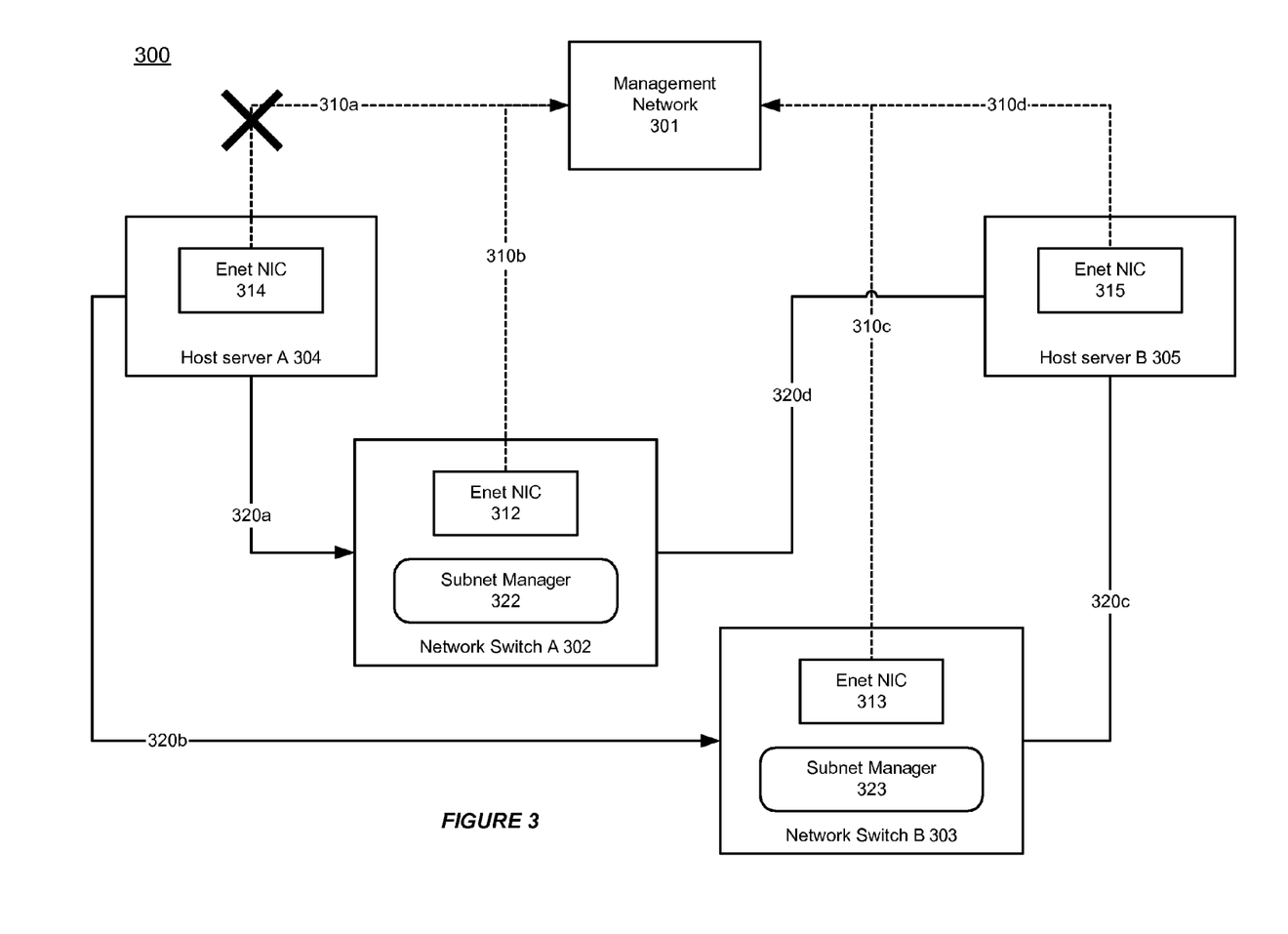
FIG. 3 shows an illustration of a middleware machine environment that can guard against single point of failure for management Ethernet connectivity, in accordance with an embodiment of the invention.

FIG. 3 shows an illustration of a middleware machine environment that can guard against single point of failure for management Ethernet connectivity, in accordance with an embodiment of the invention. As shown in FIG. 3, a management network 301 can connect to different IB fabric components in an IB fabric 300. The IB fabric can include multiple network switches 302 and 303 and multiple host servers 304-305. The connections 310a-d from different fabric components to the management network can be implemented using local Ethernet NICs 312-314.

In accordance with an embodiment of the invention, these independent switches or hosts can be interconnected with each other on an IB fabric. In the example as shown in FIG. 3, the IB fabric components are interconnected using Internet Protocol over Infiniband (IPoIB) connections 320a-d. The IPoIB connectivity is separated from the management Ethernet connectivity and can be used to guard against single point of failure for management Ethernet connectivity for the same IB fabric.

In the example as shown in FIG. 3, when a management connection 310a from a host server 304 to the management network fails, a network switch A 302 in the IB fabric can provide access to the management Ethernet network for the host server A 304 via an in-band connection 320a and a local Ethernet NIC 312. The network switch A can act as a backend, or a proxy, for the host server 304, which is a front-end node or a peer on the same IB fabric. Then, bonding and other types of IP multi-pathing protocol can be set up to implement management NIC port failover between the multiple independent switches or hosts on the IB fabric.

In accordance with an embodiment of the invention, multiple independent switches or hosts can be interconnected with each other on an IB fabric in the way as shown in FIG. 3, so that another network switch 303 can take over the proxy role and help to connect the host server A to the management network, even when another disconnection hits the network switch A at the same time.

Figure 4:
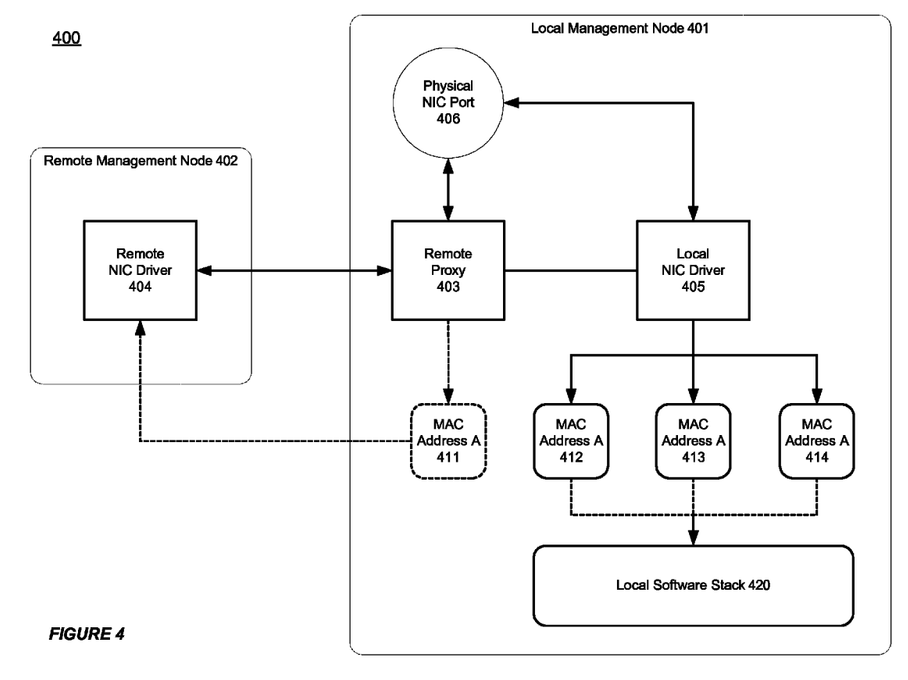
FIG. 4 shows an illustration of a middleware machine environment that supports management NIC port failover between multiple independent management nodes, in accordance with an embodiment of the invention.

FIG. 4 shows an illustration of a middleware machine environment that supports management NIC port failover between multiple independent management nodes, in accordance with an embodiment of the invention. As shown in FIG. 4, an IB fabric 400 in the middleware machine environment includes at least a local management node 401 and a remote management node 402, each of which can be either a network switch or a host server. There can be a remote NIC driver 404 on the remote management node and a local NIC driver 405 on the local management node. The local NIC driver is provided with proxy support from a remote proxy instance 403. The IB fabric can use the remote proxy instance, or a proxy extension, to support management NIC port failover between the multiple independent management nodes.

In accordance with an embodiment of the invention, the local NIC driver with proxy support can be implemented as a conventional Ethernet NIC driver that represents multiple Media Access Control (MAC) addresses 412-414 associated with a local physical NIC port 406. The different MAC addresses are machine addresses, or unique identifiers, that can be used to represent different logical interfaces for a local networking software stack 420, and the local NIC driver can dynamically assign and remove such MAC addresses.

Additionally, the proxy extension for the local NIC driver, allows a MAC address be associated with a remote peer instead of representing a logical interface for the local networking software stack. In the example as shown in FIG. 4, the remote proxy instance 403, which is the proxy extension for the local NIC driver 405, allows a MAC address A 411 to be associated with the remote NIC driver instance 404 on the remote management node 402.

In accordance with an embodiment of the invention, the system can use standard tools and commands to configure various MAC addresses that represent local logical interfaces for the local networking software stack, while using special commands or configuration files to configure MAC addresses that represents remote peers. The special commands or configuration files can explicitly identify the remote peer that a particular MAC is to be associated with.

The remote NIC driver can be instantiated as a conventional Ethernet NIC network driver within the network stack on the local platform, such as a host server or a network switch. Using standard networking configuration tools/commands, logical network interfaces with corresponding MAC addresses can be associated with the remote NIC driver. The remote proxy 403 can specify the association between a local logical interface/MAC address 411 and the remote NIC proxy driver 404 via special configuration files or commands that are specific for the remote NIC driver.

In accordance with an embodiment of the invention, a bond interface can be implemented using both a conventional physical management Ethernet NIC driver and a proxy driver to access the management Ethernet network. The proxy driver can implement an alternative NIC interface using tunneling via the fabric to a proxy module on the switch that can be used to access the management Ethernet network. The remote proxy module on a remote network switch can provide an interface to the local Ethernet NIC driver along with the standard networking stack, and can be used to represent multiple proxied IP addresses.

When the communication session between the remote NIC driver and the associated remote proxy instance is not operational, the local NIC driver can report this as "link down" or "no carrier" status to the local networking stack. Additionally, the remote NIC driver can be configured to use multiple proxies to represent a single MAC address. The remote NIC driver can have an active session to one such proxy and report "link up" or "carrier" to the local networking stack as long as at least one such remote proxy is available.

In order to ensure that fail-over can be implemented, and also ensure that local NIC interfaces are used whenever possible, the local bonding/IP multi-pathing infrastructure can be configured to use the local NIC interface as default, and only use a remote proxy whenever the local interface is not operational. Furthermore, in order to provide load spreading in a large system configuration with many nodes, the set of nodes can be divided into groups of two or more nodes that mutually provide proxy based backup connectivity for each others.

In accordance with an embodiment of the invention, different nodes on the IB fabric can be connected to different Ethernet switches and/or to different physical or logical L2 subnets via their local Ethernet NIC interfaces. A proxy scheme can be used to provide all nodes on the IB fabric with a logical interface to each relevant physical or logical network or subnet.

In accordance with an embodiment of the invention, the remote proxy instance can replicate a multicast or broadcast packet to both the local networking stack and one or more remote sessions depending on a scope of the multicast or broadcast packet.

In accordance with an embodiment of the invention, the remote NIC driver can signal link up/down to a local stack when a session that connects a remote proxy instance with an operational NIC with operational link to a management network exists. Additionally, the remote NIC driver can be configured to use conventional Internet protocol (IP) multipath schemes such as bonding in Linux and IPMP in Solaris. Also, the remote NIC driver can be used to provide connectivity from any management node in the subnet to any management network that only one or a few other management nodes in the subnet is physically connected to.

Figure 5:
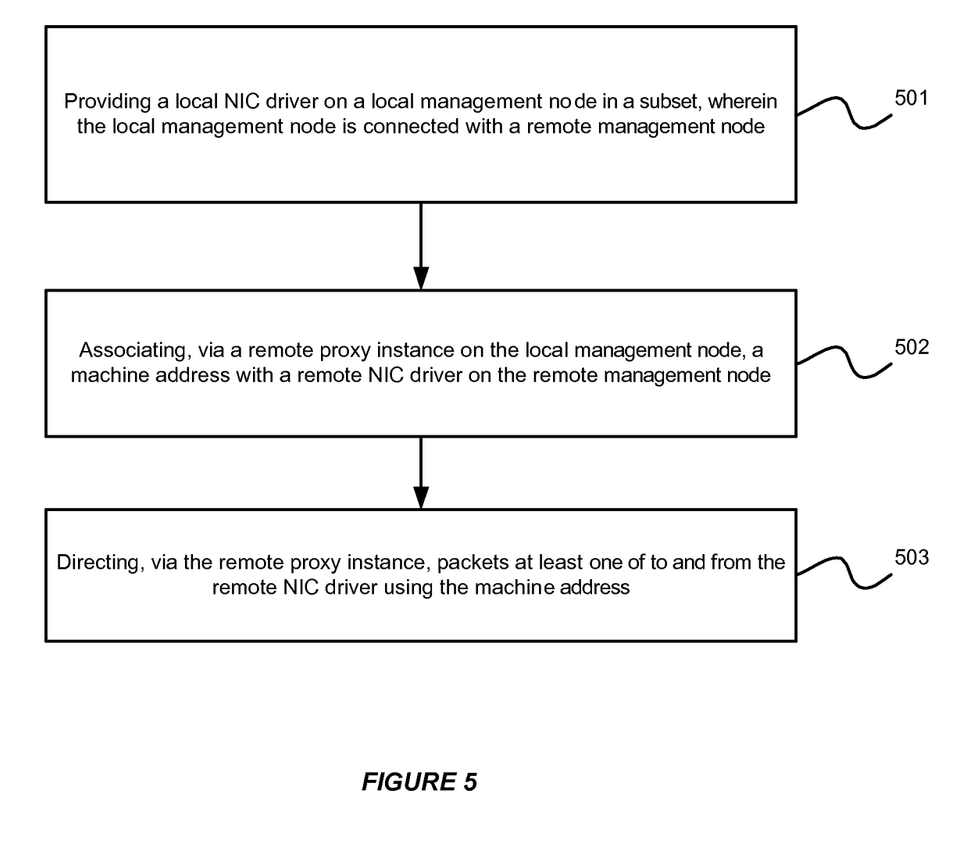
FIG. 5 illustrates an exemplary flow chart for supporting management NIC port failover between multiple independent switches or hosts in a middleware machine environment, in accordance with an embodiment of the invention.

FIG. 5 illustrates an exemplary flow chart for supporting management NIC port failover between multiple independent switches or hosts in a middleware machine environment, in accordance with an embodiment of the invention. As shown in FIG. 5, at step 501, a local NIC driver is provided on a local management node in a subnet, wherein the local management node is connected with a remote management node in the subnet. Furthermore, at step 502, a machine address, such as a MAC address, can be associated with a remote NIC driver on the remote management node via a remote proxy instance on the local management node. Additionally, at step 503, the remote proxy instance can direct packets at least one of to and from the remote NIC driver using the machine address.

Outgoing Packets

In accordance with an embodiment of the invention, outgoing multicast packets can be replicated to the local networking stack and/or to one or more remote communication sessions as appropriate, depending on which interfaces are associated with the multicast/broadcast domain.

Figure 6:
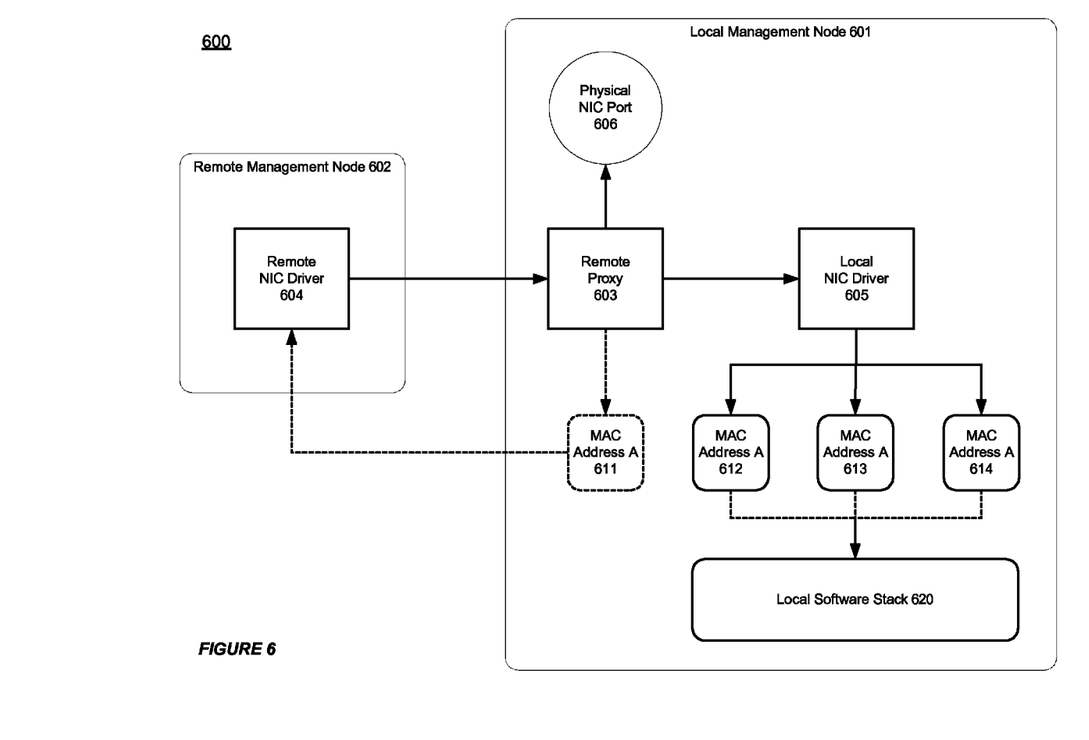
FIG. 6 shows an illustration of a system that supports sending outgoing packets from a remote management node using a remote proxy, in accordance with an embodiment of the invention.

FIG. 6 shows an illustration of a system that supports sending outgoing packets from a remote management node using a remote proxy, in accordance with an embodiment of the invention. As shown in FIG. 6, a remote NIC driver 604 on a remote management node 602 can establish a duplex IB communication session with the remote proxy instance 603 on a local management node 601. The system can configure the remote NIC driver interface and enable the corresponding remote proxy instance accordingly. Once this communication session is operational, the remote NIC driver can send outgoing Ethernet packets via the communication session to the remote proxy instance, which in turn sends the packet out on a corresponding physical NIC port 606. The remote proxy instance on the local management node can then multiplex the sending of such proxy packets with the sending of packets from the local networking stack.

In accordance with an embodiment of the invention, a unicast packet can have a destination MAC address that is targeting either a local stack of the remote proxy or a proxied interface that is handled by the remote proxy. The remote proxy can determine the correct destination based on comparing the destination MAC address in the packet with the set of MAC addresses that are currently associated with the various local and proxied interfaces that the remote proxy currently controls. The remote proxy can then forward the packet to the local networking stack if the destination MAC address is local, or via the corresponding communication session to the remote proxy interface, if the destination MAC address represents a proxied interface.

Incoming Packets

Figure 7:
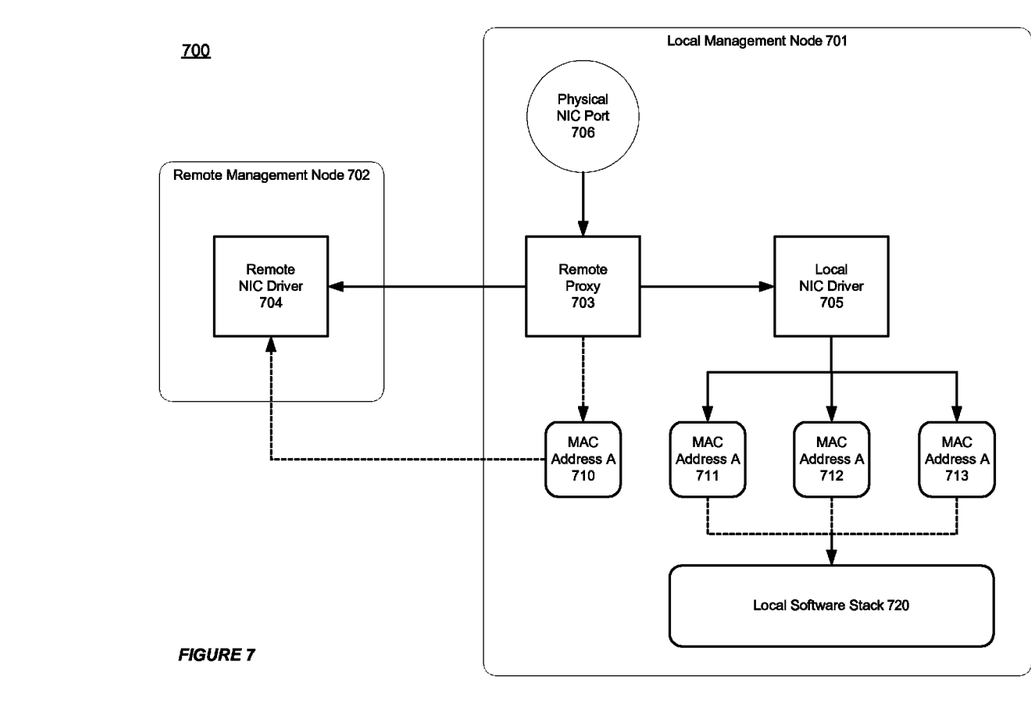
FIG. 7 shows an illustration of a remote proxy that supports receiving incoming packets, in accordance with an embodiment of the invention.

FIG. 7 shows an illustration of a remote proxy that supports receiving incoming packets, in accordance with an embodiment of the invention. As shown in FIG. 7, a remote proxy instance 703 can receive incoming packets from a local NIC physical port 706. If an incoming packet is a unicast packet, the remote proxy instance can determine if the destination MAC address is associated with the local management node 701 or a remote peer, i.e. a remote management node 702. Then, the remote proxy instance can forward the packet to the local networking stack or the corresponding remote peer via a remote communication session respectively. On the other hand, the incoming broadcast or multicast packets can be duplicated and be sent both to the local networking stack as well as on any relevant remote communication session as appropriate, depending on which interfaces are associated with the multicast/broadcast domain.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting network interface card (NIC) failover in a management network of an Infiniband (IB) fabric, comprising:
   a remote management node having a remote machine address and comprising a microprocessor, a remote Network Interface Card (NIC), and a remote NIC driver;
   a local management node comprising a microprocessor, a local Network Interface Card (NIC), and a local NIC driver;

wherein the remote management node is connected via the remote Network Interface Card (NIC) and the local NIC to the local management node to form an management Ethernet network;

wherein the local management node is configured to detect failure of the remote Network Interface Card (NIC);

wherein the local management node is configured to establish a remote proxy instance, running on the microprocessor, on the local management node, wherein the remote proxy instance associates the remote machine address with the remote NIC driver on the remote management node, and wherein the local management node is configured to, direct packets at least one of to and from the remote NIC driver over the IB fabric using the remote machine address in response to detecting failure of the remote Network Interface Card (NIC).

2. The system according to claim 1, wherein:
each management node is a either a network switch or a host server.

3. The system according to claim 1, further comprising:
another remote proxy instance on another management node in the subnet, wherein said another remote proxy instance can take over and direct packets at least one of to and from the remote NIC driver using another machine address.

4. The system according to claim 1, wherein:
the local NIC driver can dynamically assign and remove one or more machine addresses associated with a local NIC port, wherein the one or more machine addresses are used to represent local logical interfaces for a local software stack.

5. The system according to claim 1, wherein:
the remote proxy instance is configured to receive a packet having a destination machine address from the remote NIC driver over Infiniband in the event of failure of the remote network interface card.

6. The system according to claim 5, wherein:
the remote proxy instance can multiplex a sending of the packet with a sending a packet from a local networking stack.

7. The system according to claim 5, wherein:
the remote proxy instance is configured to forward the packet to a local networking stack if the destination machine address in the packet is a local address; and
the remote proxy instance is configured to forward the packet to a remote destination over Infiniband if the destination machine address in the packet is not a local address.

8. The system according to claim 1, wherein:
the remote proxy instance can receive an incoming packet from the local network interface card.

9. The system according to claim 8, wherein:
the remote proxy instance can determine whether a destination machine address in the incoming packet is associated with the local management node or the remote management node, and wherein the remote proxy instance operates to
forward the incoming packet to a network stack of the local management node, if the destination machine address in the incoming packet is associated with the local management node, and
forward the incoming packet to the remote management node over Infiniband if the destination machine address in the incoming packet is the remote machine address.

10. The system according to claim 1, wherein:
the remote NIC driver can be configured to use multiple proxies to represent a single machine address.

11. The system according to claim 1, wherein:
the remote proxy instance can replicate a multicast or broadcast packet to both a local networking stack and one or more remote sessions depending on a scope of the multicast or broadcast packet.

12. The system according to claim 1, wherein:
the remote NIC driver can signal link up/down to a local stack when a session exists, wherein the session connects a remote proxy instance with an operational NIC with operational link to a management network.

13. A method for supporting network interface card (NIC) failover in a management network of an Infiniband (IB) fabric, comprising a remote management node having a remote machine address and comprising a remote Network Interface Card (NIC) and a remote NIC driver, and a local management node comprising a local Network Interface Card (NIC) and a local NIC driver, the method comprising:
connecting the remote management node via the remote Network Interface Card (NIC) and the local NIC to the local management node to form an management Ethernet network;
detecting failure of the remote Network Interface Card (NIC);
establishing a remote proxy instance running on the local management node;
using the remote proxy instance to associate the remote machine address with the remote NIC driver on the remote management node, and
in response to detecting failure of the remote Network Interface Card (NIC), using the remote proxy instance to direct management packets between the local Network Interface Card (NIC) and the remote NIC driver over the IB fabric using the remote machine address.

14. The method according to claim 13, further comprising:
establishing another remote proxy instance on another management node, wherein said another remote proxy instance can take over and direct packets at least one of to and from the remote NIC driver using the remote machine address.

15. The method according to claim 13, further comprising:
dynamically assigning and removing one or more machine addresses associated with a local network interface card (NIC), wherein the one or more machine addresses are used to represent local logical interfaces for a local software stack.

16. The method according to claim 1, further comprising:
receiving a management packet having a destination machine address from the remote NIC driver over Infiniband in the event of failure of the remote network interface card; and
forwarding the management packet to a local networking stack if the destination machine address in the packet is a local address; and
forwarding the management packet to a remote destination via the local network interface card (NIC) if the destination machine address in the packet is not a local address.

17. The method according to claim 13, further comprising:
receiving at the remote proxy instance an incoming management packet from the local network interface card;
determining whether a destination machine address in the incoming management packet is associated with the remote management node; and in the event of failure of the remote network interface card, forwarding the incoming packet to the remote management node over Infiniband.

18. The method according to claim 13, further comprising:
using the remote proxy instance to replicate a multicast or broadcast packet to both a local networking stack and one or more remote sessions depending on a scope of the multicast or broadcast packet.

19. The method according to claim 13, further comprising:
using the remote NIC driver to signal link up/down to a local stack when a session exists, wherein the session connects a remote proxy instance with an operational NIC with operational link to a management network.

20. A nontransitory machine readable medium having instructions stored thereon for supporting network interface card (NIC) failover in a management network of an Infiniband (IB) fabric, comprising a remote management node having a remote machine address and comprising a remote Network Interface Card (NIC) and a remote NIC driver, and a local management node comprising a local Network Interface Card (NIC) and a local NIC driver, which instructions when executed cause a system to perform steps comprising:

connecting the remote management node via the remote Network Interface Card (NIC) and the local NIC to the local management node to form an management Ethernet network;

detecting failure of the remote Network Interface Card (NIC);

establishing a remote proxy instance running on the local management node;

using the remote proxy instance to associate the remote machine address with the remote NIC driver on the remote management node, and in response to detecting failure of the remote Network Interface Card (NIC), using the remote proxy instance to direct management packets between the local Network Interface Card (NIC) and the remote NIC driver over the IB fabric using the remote machine address.

* * * * *

UNITED STATES PATENT AND TRADEMARK OFFICE
CERTIFICATE OF CORRECTION

| | | |
|---|---|---|
| PATENT NO. | : 8,842,518 B2 | Page 1 of 1 |
| APPLICATION NO. | : 13/235177 | |
| DATED | : September 23, 2014 | |
| INVENTOR(S) | : Johnsen | |

It is certified that error appears in the above-identified patent and that said Letters Patent is hereby corrected as shown below:

In the Specification

In column 4, line 27, before "Ethernet" delete "managment" and insert -- management --, therefor.

In column 4, line 27, before "network" delete "managment" and insert -- management --, therefor.

In the Claims

In column 9, line 20, in Claim 2, delete "is a either" and insert -- is either --, therefor.

Signed and Sealed this
Twenty-eighth Day of April, 2015

Michelle K. Lee
*Director of the United States Patent and Trademark Office*